United States Patent [19]
Smith

[11] Patent Number: 5,546,333
[45] Date of Patent: Aug. 13, 1996

[54] DATA PROCESSOR HAVING A DATA TABLE FOR PERFORMING A DUAL FUNCTION OF ALPHANUMERIC NOTICE AND NUMERICAL CALCULATIONS

[75] Inventor: Roger A. Smith, Austin, Tex.

[73] Assignee: Motorola, Inc., Schaumburg, Ill.

[21] Appl. No.: 546,260

[22] Filed: Oct. 20, 1995

Related U.S. Application Data

[62] Division of Ser. No. 349,571, Dec. 5, 1994.

[51] Int. Cl.$^6$ .............................. G06F 12/14; H04L 9/00
[52] U.S. Cl. ......................... 364/709.05; 380/4; 395/186
[58] Field of Search ................................ 364/736, 709.05; 395/186, 187.01, 188.01, 490, 491; 380/4

[56] References Cited

U.S. PATENT DOCUMENTS

| | | | |
|---|---|---|---|
| 5,014,234 | 5/1991 | Edwards, Jr. ........................... | 395/186 |
| 5,131,091 | 7/1992 | Mizuta .................................... | 395/186 |
| 5,301,138 | 4/1994 | Lindsley ............................... | 364/748.5 |
| 5,327,563 | 7/1994 | Singh ...................................... | 395/186 |
| 5,481,672 | 1/1996 | Okuno et al. ........................... | 395/186 |
| 5,483,658 | 1/1996 | Grube et al. ........................... | 395/186 |
| 5,490,216 | 2/1996 | Richardson, III ........................ | 380/4 |

OTHER PUBLICATIONS

"An Accurate Elementary Mathematical Library for the IEEE Floating Point Standard," Gal et al; ACM Transactions on Mathematical Software, vol. 17, No. 1, Mar. 1991.

"Table–Driven Implementation of the Logarithm Function in IEEE Floating–Point Arithmetic," Tang; ACM Transactions on Mathematical Software, vol. 16, No. 4, Dec. 1990.

*Primary Examiner*—David H. Malzahn
*Attorney, Agent, or Firm*—Keith E. Witek

[57] ABSTRACT

A data processor and method are used to find $\log_p(x)$ wherein p is a numerical base and x is a floating point value. The method begins by deriving a number y from the quantity x wherein the number y has a predetermined sign portion, a predetermined exponent portion, and the fraction portion f, the predetermined fraction portion f being a truncated portion of x. A logarithm to the predetermined base p of the number y is found by calculating:

$$\log_p(y) = -\log_p(a) + \log_p(1+(ay-1))$$

where the constant a is read from a memory table of constants indexed by an index i. Index i is calculated from y where the fraction portion f of y lies in the range of $1 \leq y < 2$ and the position in this range determines index i. The $\log_p(y)$, once determined, is used to find the $\log_p(x)$ in an accurate manner as indicated in equation 16 herein.

16 Claims, 4 Drawing Sheets

DATA PROCESSOR HAVING A DATA TABLE FOR PERFORMING A DUAL FUNCTION OF ALPHANUMERIC NOTICE AND NUMERICAL CALCULATIONS

This is a divisional of application Ser. No. 08/349,571 filed Dec. 5, 1994.

FIELD OF THE INVENTION

The present invention relates generally to data processing systems, and more particularly, to efficiently finding the logarithm of a number.

BACKGROUND OF THE INVENTION

Although there are older and more inefficient methods for finding a logarithm, the most recent and relevant prior art for finding the logarithm of a number comes from one of: P. K. Peter Tang, in "Table-Driven Implementation of the Logarithm Function in IEEE Floating Point Arithmetic", ACM Transactions on Mathematical Software, 16, 1990, 378–400; and Shmuel Gal and Boris Bachelis, "An Accurate Elementary Mathematical Library for the IEEE Floating Point Standard", ACM Transactions on Mathematical Software, 17, 1991, 26–45. Both of the above techniques must check for several special logarithm cases which is very slow and inefficient. Both of the techniques taught by the references above use a compare statement to branch processing off into one of two paths (i.e., a bipolar process). This determination of which path to take is slow and also inefficient. In addition, the prior art contains operations which are more complex and less likely to perform in parallel and therefore slow the logarithm-finding process. A faster method of finding the logarithm of a number in a data processor is needed.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

In order to fully understand the following algorithms and systems, a more detailed explanation of the prior art methods is needed. The first prior art method is taught by P. K. Peter Tang, in "Table-Driven Implementation of the Logarithm Function in IEEE Floating Point Arithmetic", ACM Transactions on Mathematical Software, 16, 1990, 378–400 and in the teachings of Shmuel Gal and Boris Bachelis, "An Accurate Elementary Mathematical Library for the IEEE Floating Point Standard", ACM Transactions on Mathematical Software, 17, 1991, 26–45.

These references show that floating-point numbers are commonly represented as a signed fraction (i.e., mantissa), with magnitude between 1 and 2, multiplied by a power of 2 represented via an exponent field. A floating point number x has the representation $$x = \pm 2^e \cdot y \qquad (1)$$

where y is a number greater than or equal to 1 and less than 2 (i.e., the mantissa) and e is the power of two represented via the exponent field.

Tang gives a series of steps to be used to determine the natural logarithm of x. In Tang's step 1, x is examined to see if it is an exceptional case: not a number (NaN), zero, negative, or 1 in value. For these exceptional cases, the proper result is determined by a simple memory access of a predetermined result.

In Tang's step 2, a check is made to see if x is greater than $e^{-1/16}$ and less than $e^{1/16}$. If it is not, Tang's step 3 is executed. If it is, the following is computed $$f = x - 1 \qquad (2)$$

$$\alpha = \frac{2f}{2+f} \qquad (3)$$

$$\ln(x) = \alpha + \alpha^3 p_1(\alpha^2), \qquad (4)$$

where $p_1(\alpha)$ is a polynomial in $\alpha$. The results returned for processing are the values represented in eq. (4).

In Tang's step 3, numbers m, j and f are found such that the following is true $$x = 2^m \cdot (1 + j \cdot 2^{-7} + f), \qquad (5)$$

where $1+j \cdot 2^{-7}$ is obtained by rounding to the nearest integer the product of x and $2^{7-m}$ and then multiplying the rounded result by $2^{-7}$. Then Tang's method computes $$\ln(x) = m \cdot \ln(2) + \ln(1 + j \cdot 2^{-7}) + \ln(f \cdot (1 + j \cdot 2^{-7})^{-1}), \qquad (6)$$

where $\ln(f \cdot (1+j \cdot 2^{-7})^{-1})$ is computed by letting $u = f \cdot (1+j \cdot 2^{-7})^{-1}$ using the relationship $$\ln(f \cdot (1+j \cdot 2^{-7})^{-1}) = u + u^2 p_2(u), \qquad (7)$$

where $p_2(u)$ is a different polynomial from $p_1(\alpha)$ and has a different argument as well.

There are a number of disadvantages to Tang's method for computing the natural logarithm. First, the checking for exceptional cases delays the computation that has to be done for most arguments. This means that in most cases the real computation is delayed until the number x is guaranteed not to be an exception to the algorithm. Second, a check must be made to see if the argument x lies in a certain interval discussed above to decide whether to follow processing in step 2 or in step 3. This checking of a range further delays the point at which useful computation can begin because steps 2 and 3 use entirely different procedures. Third, step 2, when followed due to the range consideration, uses a division operation which is very slow in comparison with a multiplication or addition on many modern microprocessor. Fourth, step 3, when followed, requires the tabulation of three values for each value of j: two values which together represent $\ln(1+j \cdot 2^{-7})$ to better than hardware precision and an approximate value of $(1+j \cdot 2^{-7})^{-1}$. This is not economical in storage space and, more importantly, may have even more adverse effects on memory performance when the processor uses a cache. Most modern microprocessors and computer systems contain a cache or multiple caches.

Gal and Bachelis also have two separate procedures for calculating the natural logarithm of a floating-point number x. If x is between the numbers 127/128 and 129/128, a polynomial $p_3(x-1)$ is used, while otherwise the computation uses the mathematical identity $$\ln(x) = m \cdot \ln(2) + \ln(X_i) + \ln(1 + (y - X_i) \cdot X_i^{-1}), \quad (8)$$

where the index i is determined from bits of y and is used to look up three values: $X_i$, $\ln(X_i)$ and $X_i^{-1}$ from a table. The computation of $\ln(1 + (y - X_i) \cdot X_i^{-1})$ is performed using $$\ln(1 + (y - X_i) \cdot X_i^{-1}) = (y - X_i) \cdot X_i^{-1} + p_4((y - X_i) \cdot X_i^{-1}), \quad (9)$$

using a different polynomial. The first term on the right-hand side of eq. (9) also needs to be computed very carefully using multiple dependent arithmetic operations to avoid loss of significant bits in the result.

The implementation of their method also does comparisons at the beginning of the method to check for exceptional cases which will bypass subsequent processing to find a logarithm.

There are also a number of disadvantages to the method of Gal and Bachelis. First, comparisons are done at the beginning to check that further arithmetic is possible and to determine which of the two methods to use. Second, three different values must be stored for each interval used. This is as wasteful of memory and cache memory in a manner similar to the method taught by Tang. Third, two different polynomials are used in the two different cases. This causes the beginning of effective computations to be delayed until it has been determined which case applies. Fourth, the use of the relation in eq. (9) is slowed because of the number of excessive number of dependent operations needed to compute the first term on the right-hand side with adequate precision. The dependent operations cannot be run in parallel and therefore computational speed is lost. This is true even with the combined multiply-add operation which is present in some microprocessors, especially digital signal processors (DSPs), PowerPC™, or like processors.

Mathematical Theory behind the Algorithm of FIGS. 1–4

This section describes the mathematics and mathematical theory which is used to compute the logarithm to a base p of a floating-point number x. These methods coupled with hardware and software yield a method and apparatus which is superior to both Tang's logarithm method and Gal/Bachelis' logarithm method. The correctness of the computation of the logarithm is validated by the mathematical identity $$\log_p(x) = \log_p(2^k y) = (k + c_i)\log_p(2) - \log_p(b_i) + \log_p(1 + (a_i y - 1)), \quad (10)$$

which is valid for quantities $a_i$, $b_i$ and $c_i$ satisfying the relationship $$b_i = 2^{c_i} \cdot a_i. \quad (11)$$

The computation of $\log_p(1 + (a_i y - 1))$ is carried out using a polynomial approximation $$\log_p(1 + (a_i y - 1)) \approx (a_i y - 1) + p_0(a_i y - 1). \quad (12)$$

The method is implemented using a careful selection of the values $a_i$, $b_i$ and $c_i$ and a careful way of adding together the various terms in eq. (10) using eq. (12).

To be explicit, we consider the computation of the natural logarithm of a number x. A number y can be formed from the argument x by copying x to y and replacing the exponent field of the floating-point representation of y by the exponent field used for representing the floating-point representation of the number 1. This gives a valid number whether the original argument was numeric or not (e.g., not a number (NaN)). The number y, in IEEE floating-point representation, will represent a number greater than or equal to 1 but less than 2 due to the above replacement of the exponent field.

The number y lies in one of $2^N+1$ intervals between 1 and 2. In other words, a number line can be represented where 1 is at the left side and 2 is at the right side and $2^N+1$ intervals divide this range into segments. The fixed number N in a useful computation may typically be 7 although any numeral (preferably an integer) is possible. The choice of N reflects a tradeoff between higher computational speed (higher N) and lower table size requirements (lower N). Let n be the binary number represented by the first N+1 bits after the binary point or hidden bit of the number y. The binary point is to a binary number what a decimal point is to a decimal number. The interval index i in which the value n lies is determined as $$i = \left\lfloor \frac{n+1}{2} \right\rfloor. \quad (13)$$

In this equation, $\lfloor X \rfloor$ means the largest integer not greater than X. For example, $\lfloor 25.325 \rfloor = 25$.

This selection guarantees that y is within a distance $2^{-(N+1)}$ of the number $1 + i \cdot 2^{-N}$. The index i is used to look up table values $a_i$ and $-1 - \log_p(b_i)$ in a memory. The memory is coupled to a central processing unit (CPU) which is performing the calculations taught herein and accessing memory to do so. The number $c_i$ is chosen to be 0 if y is near 1 and $c_i$ is chosen to be 1 if y is near 2 in the above-described number line. An excellent choice for determining whether $c_i$ is 0 or 1 is to take $c_i$ to be 0 if i is less than $2^N(\sqrt{2}-1)$ and 1 otherwise. The purpose of separating $a_i$ into two parts is to enable the choices $b_0=1$ and $b_{2^N}=1$ which ensure an accurate result when the original argument x is close to 1.

The number $a_i$ is rather heavily constrained by two requirements which are imposed to enable a very precise result to be obtained for the calculated logarithm. The first constraint is that for a number y which gives rise to an interval index i (see Eq. 13), the product $a_i y - 1$ must be smaller in magnitude than $2^{-(N+1)}$. This means that $a_i$ must be near the quantity $1/(1 + i \cdot 2^{-N})$. The second constraint is easier to express for a specific class of implementations but is easily generalized to other situations. Numbers which can be represented in IEEE double precision formats without additional exponent biases all have natural logarithms which can be represented as binary numbers with no more than 10 bits to the left of the binary point. An exactly representable number with that many bits to the left of the binary point can have at most 43 bits to the right of the binary point. In this instance, the second requirement is that $a_i$ must be a number for which the quantity $\ln(b_i)$ is approximated very precisely by a number which has no more than 43 bits to the right of the binary point. This is more than a limitation on the number of significant bits, it is also a limitation on where those bits can be positionally. In a specific implementation, we have chosen the $a_i$ so that the difference between the exact $\ln(b_i)$ and the approximate $\ln(b_i)$ have the first 73 bits to the right of the binary point all zero. Finding such numbers is a task which needs to be done just once and thereafter the same numbers can be used from memory for all logarithm computations for any number.

With these preliminary conditions satisfied, there are two cases to consider. However, the cases only differ in the final steps, so that the computation common to both (which are located at the beginning of the process) can be started regardless of which path is taken well before it is necessary to determine which final steps to take. The first case of the two cases occurs when i is either 0 or $2^N$ and $k+c_i$ is identically 0. This condition is fast to compute by performing a logical OR operation of the integer $k+c_i$ with the result of the logical AND of i and $2^N-1$; the result is 0 if the condition is satisfied and non-zero otherwise.

In the first case, the terms $(k+c_i)\log_e(2)$ and $\log_e(b_i)$ are both zero. In this case, $$\log_e(x) = \log_e(1+(a_i y-1)), \quad (14)$$

i is 0 or $2^N$, $a_0=1$ and $a_{2^N}=\frac{1}{2}$. In the IEEE representation for floating-point numbers, $w=a_i y-1$ is exactly representable which may be computed without error either by carrying out the multiplication and then the subtraction or by carrying out a single arithmetic operation which performs both the multiplication and the subtraction before rounding. The logarithm may then be computed as $$\log_e(x) = w + p_0(w) \quad (15)$$

Any error in the result comes from the polynomial approximation and any rounding errors which occur in evaluating the approximation. The first term on the right-hand side of eq. (15) is larger than the second term by a factor of at least $2^{N+1}$.

In the second case, the absolute value of the term $(k+c_i)\log_e(2) - \log_e(b_i)$ is larger than $2^{-(N+2)}$. This provides a representation of the logarithm as a sum of a large part and small part:

$$\log_e(x) = \text{large} + \text{small} \quad (16)$$

$$\text{large} = (k+c_i)[\log_e(2)]_h + [\alpha_i y]_h - 1 - \log_e(b_i)$$

$$\text{small} = (k+c_i)[\log_e(2)]_l + [\alpha_i y]_l + p_0(w)$$

Again, the example of double precision IEEE logarithms shows how this decomposition is done. The large term should be representable as a number with at most 10 bits before the binary point and 43 bits after the binary point. Since $k+c_i$ is an integer, $[\log_e(2)]_h$ is chosen by truncating the exact value of the logarithm of 2 after 43 bits. This allows $(k+c_i)[\log_e(2)]_h$ to fit in the specified format. The term $[a_i y]_h$ is easily obtained by rounding the double-precision product, which is generally not exact, to single precision. The rounded product will have at most 1 bit before the binary point and at most 24 bits after the binary point and thus also fits in the specified format. By the choice of the $a_i$, the term $-1-\log_e(b_i)$ also fits into the specified format. The "small" term uses the next 53 bits of the logarithm of 2 as $[\log_e(2)]_l$. The term $$[a_i y]_l = a_i y - [a_i y]_h \quad (17)$$

may be computed in several ways. The simplest, in a microprocessor which implements a single multiply-add instruction, is to carry this operation out in one operation. In other architectures, a slightly larger amount of work is required to carry out the computation of eq. (17) without losing too many significant bits. The same polynomial may be used as in the first case discussed above. A suitable polynomial is $$p_0(w) = w p(w) = w(\beta_2 w + \beta_3 w^2 + \beta_4 w^3 + \beta_5 w^4 + \beta_6 w^5 + \beta_7 w^6) \quad (18)$$

with polynomial coefficients (in IEEE hexadecimal representation) of $$\beta_2 = 0xBFE0000000000000 \quad (19)$$

$$\beta_3 = 0x3FD5555555555555$$

$$\beta_4 = 0xBFCFFFFFFFFF1F8C5$$

$$\beta_5 = 0x3FC99999999449EB$$

$$\beta_6 = 0xBFC555715CA0CD75$$

$$\beta_7 = 0x3FC249364ADD74AE$$

For N=7 in either case, the maximum error in the logarithm after the final addition which rounds the result is one-half plus about $\frac{1}{256}$ of the value of the least-significant bit position of the result. For purposes like computing the power function, the maximum error before the last rounding is about $\frac{1}{256}$ of the value of the least-significant bit position of the result.

It is important to note that a very slight alteration permits the algorithm to work for denormalized numbers as well. If the exponent field of the number indicates that the argument is a denormalized number, the number is scaled by multiplying it by $2^{52}$. A variable scale is set to 0 for the normalized case and reset to $-52$ if argument is denormalized. Then the previous approach works provided that k is replaced by k'=k+scale in the above equations.

DETAILED DESCRIPTION OF FIGURES

Figure 1:
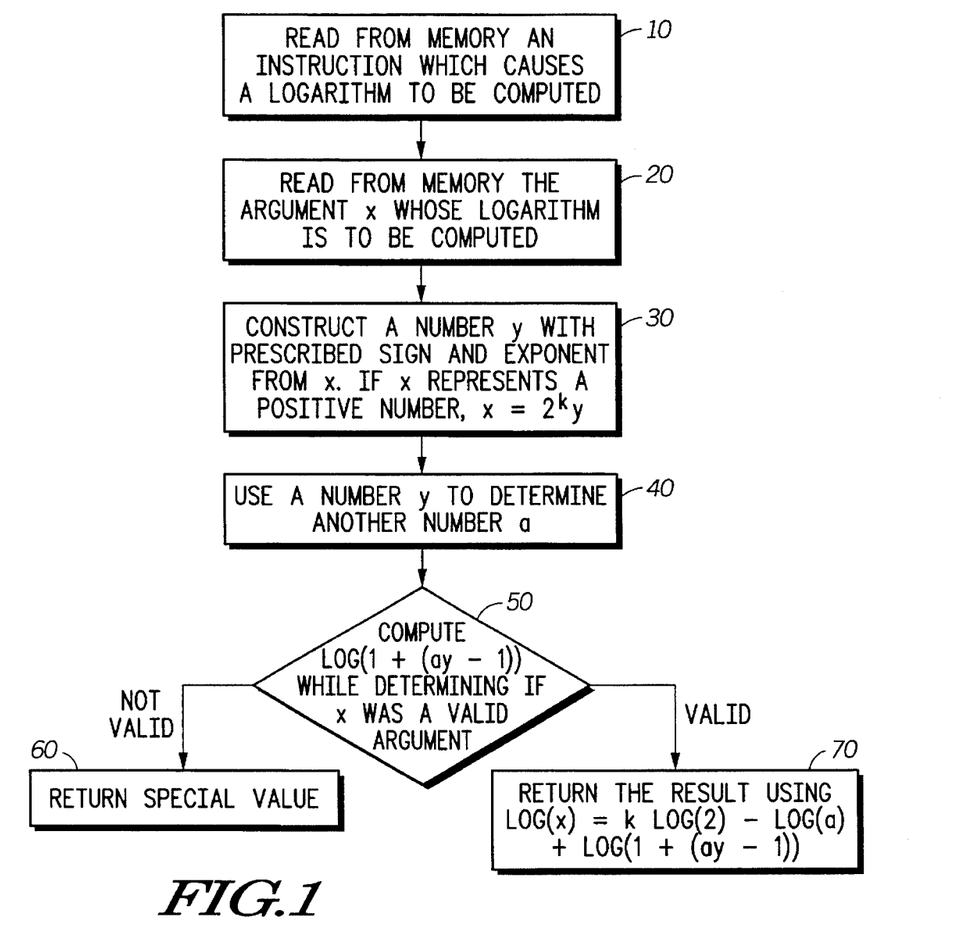
FIGS. 1–4 illustrate, in flowcharts, a method for finding the logarithm of a number in a data processor.

FIG. 1 illustrates the computation of a logarithm by a data processor. In step 10, the processor reads from some memory region an instruction which causes the logarithm of an argument x to be evaluated. In step 20, the processor reads from some memory region the argument x whose logarithm to some numerical base is to be computed. The argument may represent a particular numeric value, infinity, or Not a Number (NaN). Whether the argument represents a particular numeric value or not, it may or may not have a logarithm which can be represented by a real number.

Step 30 constructs a number y from the argument x such that if x represents a normalized numerical value, then $x = \pm 2^k y$ with $1 \leq y < 2$. If x does not represent a numeric value, y still represents a numeric value which can be used in arithmetic operations without causing any exceptions, which can enhance speed and performance by not having to check initially for special conditions. The early generation of a valid y provides a very fast route for computing the logarithm in almost all cases normally encountered. The additional processing required for a denormalized numeric argument is illustrated in FIG. 2.

Step 40 uses the bit representation of the argument x or of the number y as a basis for reading from memory a predetermined quantity a. An efficient way of determining which predetermined quantity a is to be read is described in FIG. 3.

Step 50 determines whether the logarithm of the argument x exists or not. If it does, it returns a close approximation to the logarithm obtained by evaluating $\log(y) = -\log(a) + \log(1+(ay-1))$ and $\log(x) = k\log(2) + \log(y)$ in step 60. The details of one way in which this can be performed will be described by FIG. 3. If the logarithm of the argument does not exist, a return path which provides further information is performed in step 70. An efficient way of returning this further information in one environment is described in further detail in FIG. 4.

Figure 2:
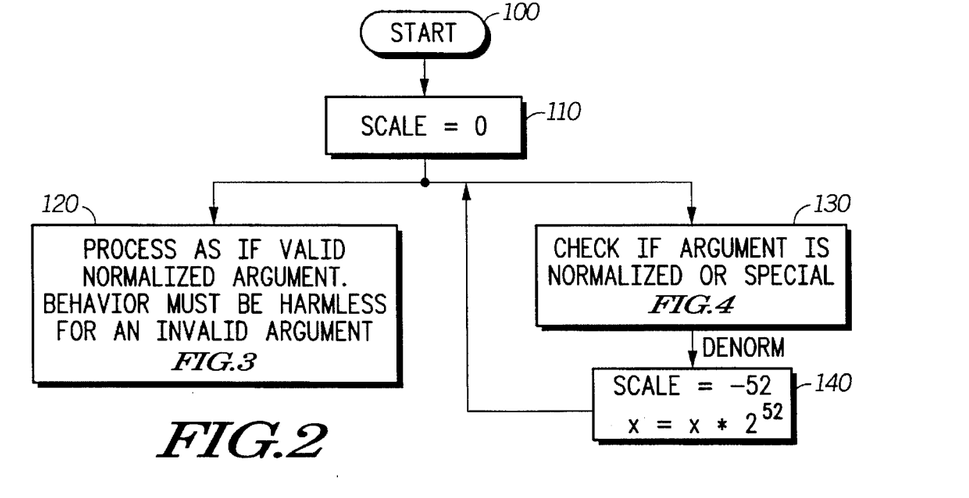

FIG. 2 illustrates the overall process flow which enables a very efficient logarithm calculation to be made for most arguments and shows what is performed for denormalized arguments. In step 100 the process begins. The argument x is assumed in FIG. 2 to have already been obtained from some memory region. In step 110, a variable "scale" is initialized to 0. The step 120 and the step 130 can be performed concurrently. This concurrent execution is advantageous on many processors and particularly advantageous on superscalar processors. Step 120 carries out the sequence of operations which will turn out to be the correct operations if the argument is a normalized floating-point number. In addition, these operations will be harmless if the argument is not a normalized floating-point number. The operations are described in more detail in FIG. 3. Step 130 checks to see if the argument is a normalized floating-point number as described in further detail in FIG. 4. If it is a normalized floating-point number, then step 130 does nothing further. If the argument is a quantity which does not have a real logarithm, step 130 returns a value indicating that no real logarithm exist for the argument x. The only other alternative left is that the argument is a denormalized floating-point number. In that case, step 130 is followed by step 140 which decreases "scale" by 52, multiplies the argument by $2^{52}$, and returns to concurrent execution of steps 120 and 130. On the second time around, the argument is guaranteed to be a normalized number.

Figure 3:
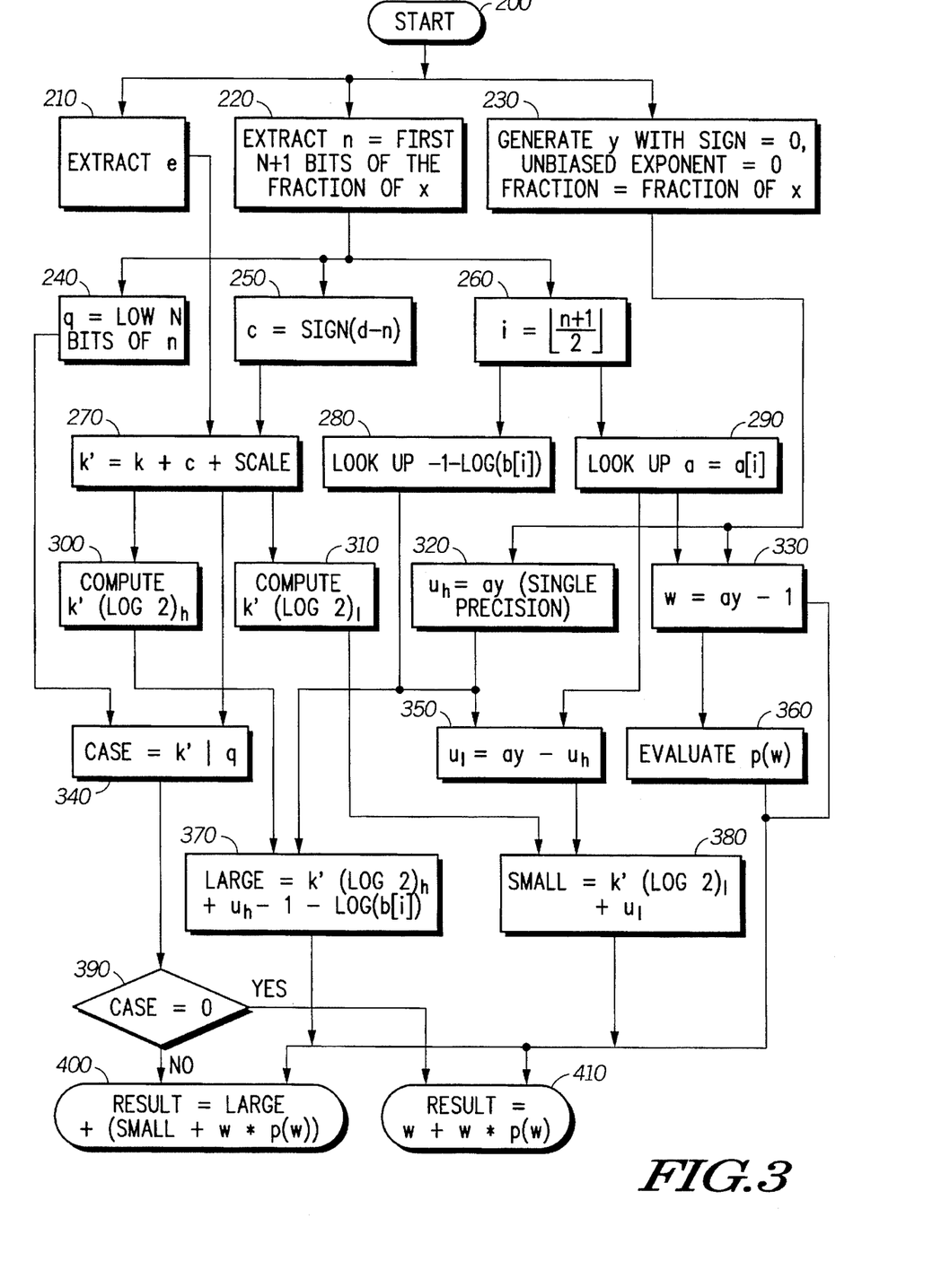

FIG. 3 illustrates the process which is to be carried when the argument is a normalized floating-point number with an additional scaling factor of $2^{scale}$. In a particular implementation, the integer N will have a specific value, like 7. In this figure, the different steps do not need to be executed in a particular order. Each step must wait until the steps which it depends on (i.e. the operations an operation Z depends on are the operations which precedes or lies above the operation Z) have been performed to completion. In other words, the steps which it depends on are those with lines directed towards it. The scheduling of the precise order in which the steps are done will vary from one processor design to another.

The process which correctly calculates the logarithm of a normalized number with additional scale factor starts at step 200. In step 210, the exponent field of the floating-point scaled argument is extracted. Independently, in step 220, a quantity n which is the value of the first N+1 bits of the fraction of the scaled argument is extracted. Independently, in step 230, the quantity y is generated from the scaled argument by setting the sign bit to 0 and the exponent field bits to those corresponding to a number greater than or equal to 1 but less than 2. Steps 240–260 each make independent calculations having to do with the interval index i. Step 240 evaluates a quantity which will be 0 if y is in the first or last interval as described in the mathematical section. Step 250 calculates $c_i=\text{sign}(\lfloor 2^{N+1}(\sqrt{2}-1)\rfloor)-n)$ which gives the desired 0 or 1 discussed in the mathematical section. The first term in the sign function is a simple integer with a fixed constant value in any particular implementation. Step 260 computes the interval index i by adding one to n and dropping the least-significant bit from the result for the addition of one. This value will be used for indexing the memory table(s) to find $a_1$ and $-1-\log(b_i)$.

Step 270 computes a modified argument exponent k'=k+$c_i$+scale, while steps 280 and 290 perform the table lookups of $a_i$ and $-1-\log(b_i)$. The result k' is computed in both integer and floating-point format.

Steps 300 and 310 compute the terms k'[log(2)]$_h$ and k'[log(2)]$_l$. Step 320 computes $[a_iy]_h$ by computing the product and rounding the result to single-precision format. Step 330 computes the value $w=a_iy-1$. This result is exact if eq. 15 is used for evaluating the logarithm, and is accurate enough for polynomial evaluation when eq. 16 is used for evaluating the logarithm. Step 340 determines which of these methods will be applied at the end by taking the logical OR of the result of step 220 and the integer format of the result of step 270. The zero/non-zero value of this result will be used later in step 390 to choose which of two methods finishes the calculation. Step 350 computes $[a_iy]_l=a_iy-[a_iy]_h$. In a processor which can do an atomic multiply-add instruction, one instruction suffices to carry out this calculation with sufficient accuracy. Otherwise, several instructions are likely to be needed to determine the result without losing too many significant bits to internal processor cancellation. Step 360 computes the polynomial p(w). Steps 370 and 380 compute the quantities "large" and "small" as discussed in the mathematics section herein.

Step 390 uses the result of step 340 to determine which final method to apply. Step 400, which is applied if the original argument x was not very close to 1, as evidenced by a non-zero result to step 390, uses the "large" and "small" values and the polynomial previously computed in step 360. Step 410, which is applied if the original argument was almost 1, as evidenced by a zero result to step 390, uses only the values w and p(w). The value given by one of these cases is the value to be returned as the proper logarithm.

Figure 4:
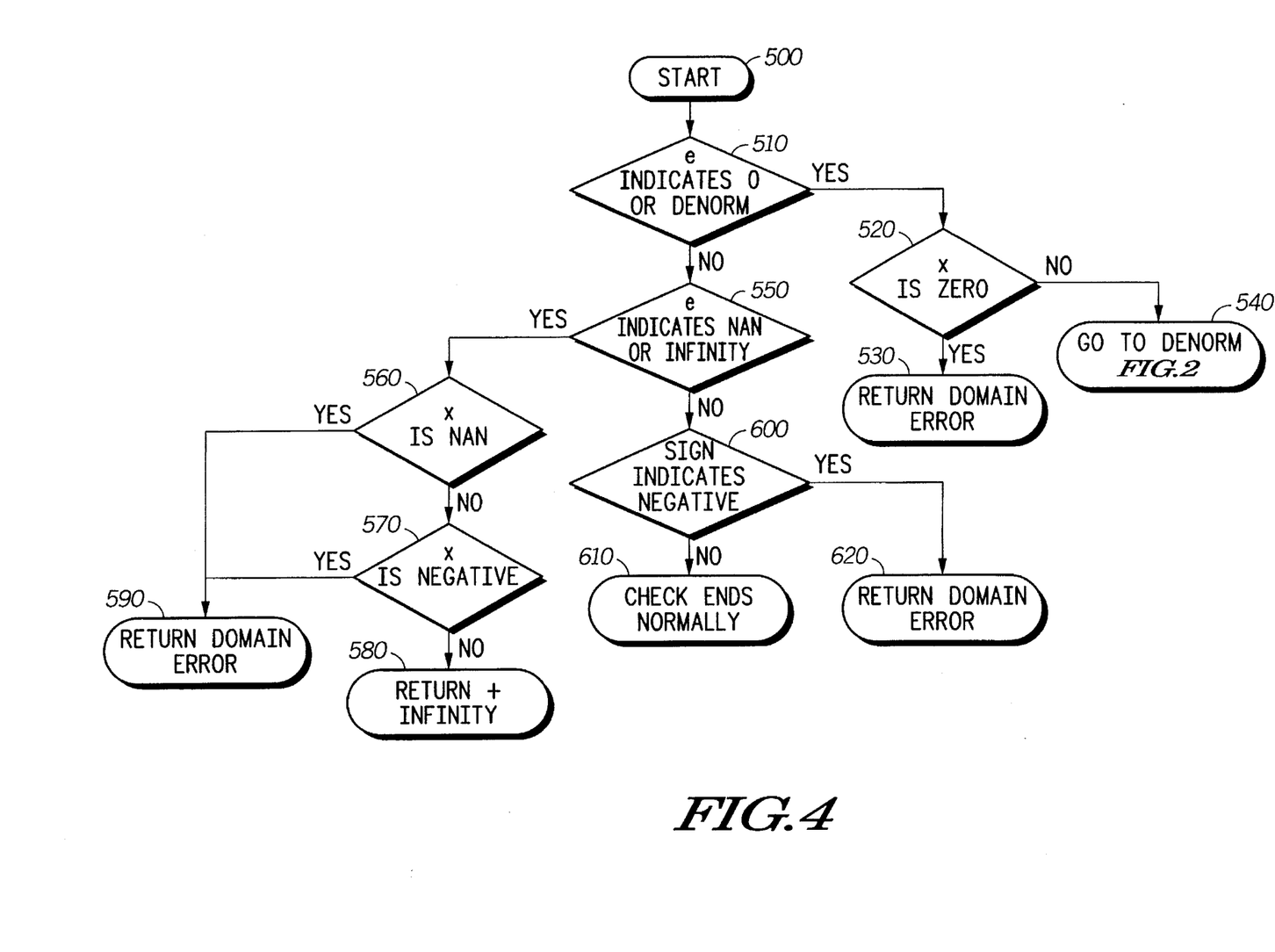

FIG. 4 illustrates the checks which can be performed in parallel with the steps of FIG. 3 described herein. The requirement is that these checks should finish and should prevent return of a value by the steps in FIG. 3 if the argument is not numeric, needs to have a special value returned, or if the argument is a denormalized number. If the checks are satisfied, then no action needs be taken. FIG. 4 illustrates a common treatment of exceptional arguments and alternative treatments are easy to deal with if other conditions or system environments require it. The checking starts with step 500. The exponent field of the argument is checked for 0 in step 510. If the exponent field of the argument is 0, then the argument is either zero or a denormalized number. Step 520 checks whether the argument is zero. If the argument is zero, then in step 530 a domain error indication is returned as the result of the logarithm calculation. Otherwise, in step 540, control returns to FIG. 2, where the denormalized number will be scaled and normalized.

Step 550 checks to see whether the exponent field is all '1' bits. If it is, the argument is either an infinity value or a Not a Number (NaN). Step 560 sorts out which of these two cases, infinity or NaN, is present. If the argument is a NaN, a domain error is returned in step 590. If the argument is an infinity, step 570 checks whether the infinity is positive or negative. If positive infinity, a positive infinity result is returned in step 580. Otherwise, a domain error is returned in step 590.

If the exponent field was not all 0 bits and not all 1 bits, step 600 checks to see if the sign was positive. If not, a domain error is returned in step 620. Otherwise, the checking is done and the computation being done in parallel as shown in FIG. 3 will return the final value.

Figure 5:
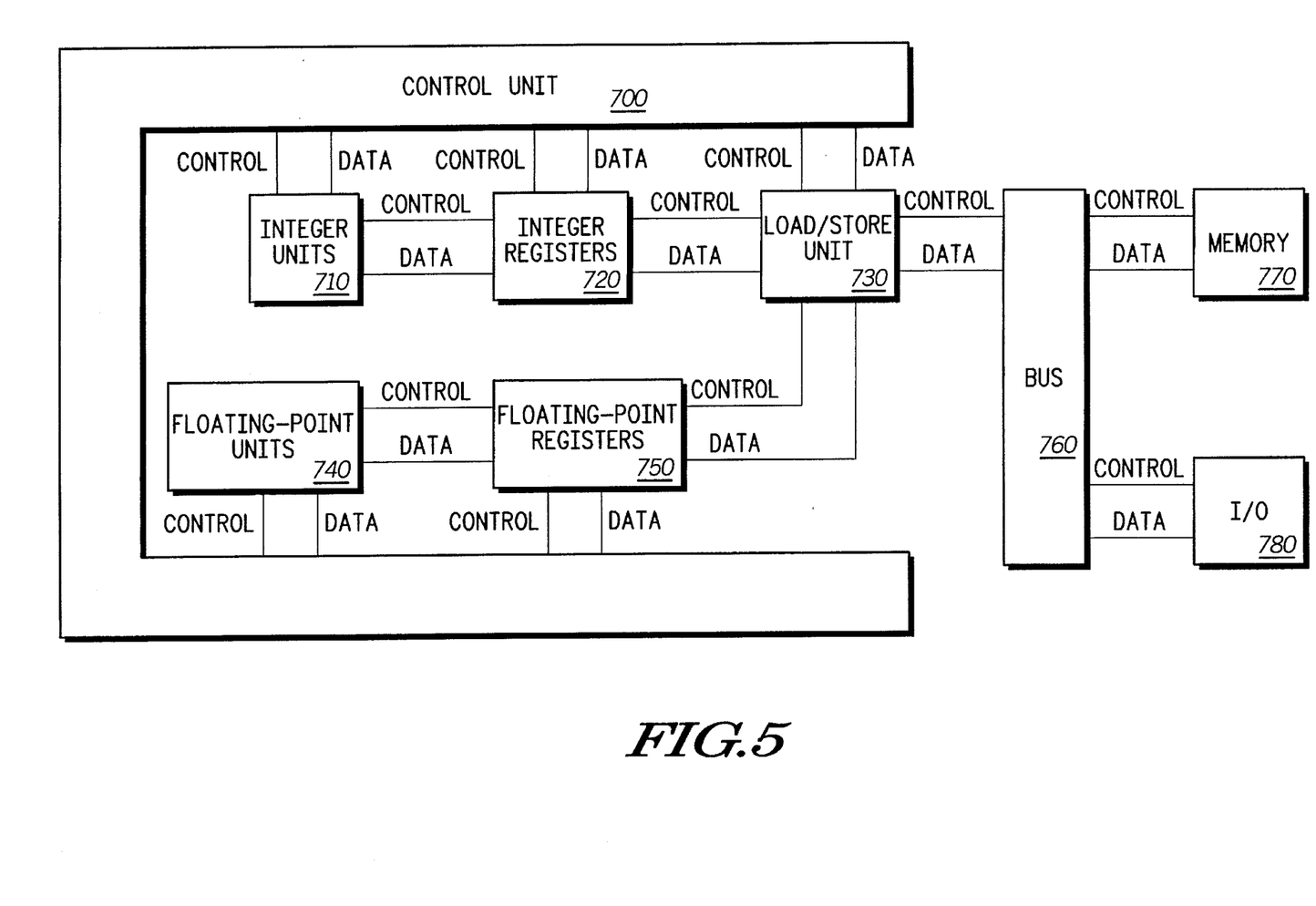
FIG. 5 illustrates, in a block diagram, a data processor which is used to find the logarithm of a number.

FIG. 5 illustrates a processor in which the computations described herein can be accomplished. The processor contains a control unit 700 which sequences the steps in the flowcharts herein, possibly allowing multiple steps to be carried out in parallel on integer units 710 and floating-point units 720. The integer units operate on values in integer registers 720, and the floating-point units operate on values in floating-point registers 730. The registers are loaded from or stored to memory through a load/store unit 730, which connects via a bus 760 to external memory 770 or I/O devices 780. Control and data lines provide a means for the transfer of control information and data among the different units. In a particular implementation, it is not necessary that all of these units be distinct but can be combined or excluded if other equivalent structures are implemented.

COMPARISON WITH PRIOR ART

In comparison with the prior art, the method and data processor described herein has numerous advantages.

First, the specific use of the relationship $$\log(y) = -\log(a) + \log(1 + (ay - 1)) \quad (20)$$

requires only two table entries per interval instead of 3. This fact reduces the memory size used for tables and reduces the impact on cache performance over the prior art methods discussed herein.

Second, the specific use of the relationship described by eq. (20) is faster than using either Tang's relation described in eq. (6) or Shmuel and Bachelis's relation described in eq. (8) which rely on the use of an approximate reciprocal. The approximate reciprocal has two drawbacks: it requires further dependent calculations to attain a sufficiently accurate result and, in the region near 1, it forces markedly different calculations in two regions which slows computations. The method taught herein also differs in the final steps used to find a logarithm when in one of the two similar regions (first region is a region around 1 and a second region is a region not around 1). The invention is particularly fast to implement in a processor architecture which has an atomic multiply-add instruction and straightforward in any processor architecture with floating-point arithmetic.

Third, the use of a single polynomial approximation in the present method makes it possible to start earlier the calculation of the polynomial which will be used. This is a significant improvement over the prior art. It enables the dominant code used in any implementation to begin as early as possible, thereby finishing sooner than the prior art.

Fourth, the way in which the interval is selected is faster in the current method. Much of the work can be done in an integer execution unit which in most microprocessors has a smaller latency than the floating-point unit. In many microprocessors, it is desirable to distribute the computing load among different execution units and to carry out the computations which determine whether branches will be taken as much in advance as possible (would like to know where the branch will go well before encountering the branch in a manner which slows the branch's execution). The implementation of this invention utilizes this technique to reduce the possibility of incorrect speculative branching.

Fifth, the determination of table values a, with the properties that $a_i y - 1$ be small for any value of y in interval i and that $\text{in}(b_i)$ is approximated very precisely by a number which has no more than 43 bits to the right of the binary point requires a significant investment of research and development time and effort. The numbers $a_i$ used in this computation are represented by a sequence of eight bytes. There is sufficient flexibility in the choice of all except the first few of these numbers that the first requirement can be satisfied by the choice of the first three bytes independent of the last 5 bytes.

Achieving the second requirement is possible using 4 more bytes. This leaves unused one byte in all except the first few table entries. These bytes were used to insert an ASCII representation of a copyright message into the table. The point is that while it would be possible to simply change these characters, to do so would almost certainly destroy the second property that is important to the correctness of the present method. Therefore, a copyright notice is placed into the memory tables of data where the actual message is used as a part of the data. If the data is copied, it can be easily determined by the copyright message. If the data is changed to destroy the copyright notice, the algorithm will not function properly. Therefore, this method of placing a copyright or identifying ASCII pattern into data is extremely useful to avoid pirating of code.

Sixth, the commonality of the calculation for all arguments makes the algorithm more efficient for uses where the logarithm is being calculated as part of another elementary operation. For example, the logarithm of x to another base p can be computed using the relation $\log_p(x) = \ln(x) \cdot \log_p(e)$. To carry this out accurately, the ln(x) needs to be computed with additional accuracy so that the error in the result comes primarily from one rounding and not two roundings. A minor alteration of the optimal embodiment has been used to compute the logarithm to base 10 with greater speed, with less use of memory, and with comparable numerical accuracy. As another example, the power function has been implemented using the relationship $x^y = e^{y \ln(x)}$. The use of a single main control flow in this example has many benefits in permitting other tests and computations which are needed for the exponential part of the calculation to be merged into the calculation of the logarithm.

Possible Changes and Optimizations of the Method Taught Herein

The optimal embodiment discussed herein computed the natural logarithm of a double precision quantity. Any number of natural modifications and improvements could adapt the embodiment to other situations.

Only minor changes in the method discussed herein are needed to compute logarithms to a different base. Natural bases to choose are 2 and 10. An alternative is to use the results available in the present invention just before the end to multiply the result by a constant using the mathematical relationship $\log_p(x) = \ln(x) \cdot \log_p(e)$. This computation can be performed very efficiently in a processor which has an atomic multiply-add instruction and with just a little more effort on any processor with IEEE arithmetic.

Only minor changes in the method discussed herein are needed to compute the logarithm part of the power function using the relationship $x^y = e^{y \ln(x)}$. For example, if x is negative but y is an integer, the computation is still correct. In addition, there is good opportunity to merge some of the testing for the exponential part of the calculation into the logarithm part of the computation.

The particular choice of the value N and the way in which the intervals are computed may naturally vary from one implementation to another depending on accuracy and speed requirements.

The specific ordering of the instructions is very flexible, with the constraints given by the flow diagram in FIG. 3 and FIG. 4. Constants used may be changed or optimized given the criterions taught herein.

The polynomial evaluation may be adapted or rearranged in various ways without significantly affecting the accuracy of the computation. The extent to which this is useful is very dependent on details of the specific processor, as the other computations need to be scheduled in or along with the polynomial evaluation. In addition, the specific choice of degree of polynomial and the actual coefficients may be altered without significantly altering the accuracy or speed of the computation.

The first constraint a, that (a,y−1) should be smaller in magnitude than $2^{-(N+1)}$, can be relaxed at the cost of introducing increased error into the logarithm calculation.

The choice of table values, as discussed previously, leaves a lot of flexibility. In the present embodiment, some of the extra degrees of freedom have been used to insert a protection message directly into some bytes of the data. This message cannot be changed in a naive way without destroying some of the important properties of the data. Plurality, as used herein, is intended to mean any integer between two and positive infinity and should not be limited to any particular integer or sub-range.

While the present invention has been illustrated and described with reference to specific embodiments, further modifications and improvements will occur to those skilled in the art. It is to be understood, therefore, that this invention is not limited to the particular forms illustrated and that it is intended in the appended claims to cover all modifications that do not depart from the spirit and scope of this invention.

What is claimed is:

1. A data table stored in memory, the data table comprising:
   a plurality of data values used by a central processing unit (CPU) for a first purpose, the first purpose being that the plurality of data values are selectively provided to the CPU as data operands to enable at least one mathematical operation, the plurality of data values being stored as binary bits in memory coupled to the CPU, several of the binary bits of each of the data values in the plurality of data values being used collectively to encode a message for a purpose other than the first purpose.

2. The data table of claim 1 wherein the at least one mathematical operation will not operate properly if the message within the data values is changed to another message.

3. The data table of claim 1 wherein each data value in the plurality of data values corresponds to an element in another data table wherein if the message within the data table is changed, then the data table will not coincide with the another data table.

4. The data table of claim 1 wherein the message contains a copyright notice.

5. The data table of claim 1 wherein the at least one mathematical operation determines the logarithm of a number x by generating control signals within the CPU.

6. The data table of claim 1 wherein the at least one mathematical operation performs floating point operations within the CPU.

7. A data processing system comprising:
   a central processing unit (CPU) coupled to a conductive bus containing a plurality of conductive members;
   a memory coupled to the conductive bus for communicating with the CPU, the memory containing a plurality of data values which are used by the CPU as data operands for mathematical operations performed within the CPU via generation of CPU control signals, the data values serving an additional purpose of providing an alphanumeric message when printed in a textual format.

8. The data processing system of claim 7 wherein the alphanumeric message is a copyright notice.

9. The data processing system of claim 7 wherein the alphanumeric message is stored in an ASCII format.

10. A data provider stored on computer readable medium for access by a data processing system, the data provider comprising:
    means for providing a plurality of data values to the data processing system as operands for mathematical operations; and
    means for presenting the same plurality of data values used as operands for mathematical operations as an alphanumeric message.

11. The data processing system of claim 10 wherein the plurality of data values contain N total bits which are used as operands to the mathematical operations and M total bits which are used as the alphanumeric message, wherein both N and M are finite positive integers and N is numerically greater than M.

12. The data processing system of claim 11 wherein the N total bits are stored in a format that is used for floating point calculations.

13. The data processing system of claim 11 wherein the M total bits are in a format that is used to present an ASCII message as the alphanumeric message.

14. The data processing system of claim 10 wherein the alphanumeric message is a copyright notice.

15. The data processing system of claim 14 wherein the mathematical operations are performed improperly if the copyright notice is changed.

16. The data processing system of claim 10 wherein the mathematical operations are performed improperly if the alphanumeric message is changed.

* * * * *